United States Patent [19]
James

[11] 3,789,205
[45] Jan. 29, 1974

[54] METHOD OF TESTING MOSFET PLANAR BOARDS

[75] Inventor: Randell Leland James, Austin, Tex.

[73] Assignee: International Business Machines Corporation, Armonk, N.Y.

[22] Filed: Sept. 28, 1972

[21] Appl. No.: 293,270

[52] U.S. Cl. .......... 235/153 AC, 324/73 R
[51] Int. Cl. .......... G06f 11/04
[58] Field of Search .......... 235/153 AC; 324/73 R; 340/172.5

[56] References Cited

UNITED STATES PATENTS

| | | | |
|---|---|---|---|
| 3,445,811 | 5/1969 | Hashimoto et al. | 235/153 AC |
| 3,469,186 | 9/1969 | Gowan | 324/73 R |
| 3,471,778 | 10/1969 | Bennett et al. | 324/73 R |
| 3,633,016 | 1/1972 | Walker et al. | 325/153 AC |
| 3,657,527 | 4/1972 | Kassabgi | 325/153 AC |
| 3,681,757 | 8/1972 | Allen et al. | 235/153 AC |

OTHER PUBLICATIONS

Jordan, Integrated Circuit Testing, IBM Technical Disclosure Bulletin, Vol. 13, No. 5, Oct. 1970, pp. 1093–1094.

*Primary Examiner*—Charles E. Atkinson
*Attorney, Agent, or Firm*—John L. Jackson

[57] ABSTRACT

A technique of testing a MOSFET planar board in which each of the chips on the planar board can be electronically isolated for individual testing. In MOSFET technology there are two off chip inverters between the output logic blocks and the pins. These are the preoff chip inverter and the off chip inverter. A NOR gate is formed by adding an additional input line to each of the preoff chip inverters of each of the chips on the board, and the output of each of the chips which are not to be tested are driven to logical ones by application of a positive logical level to this input line while no input is applied to the NOR gates on the outputs of the chip which is to be tested. In this manner, all inputs to the chip to be tested are at a one or high logical level, and for test purposes each input to the chip can be brought to a low logical level or left at a high logical level in accordance with the test pattern to be applied. Its output or reaction to the input test patterns is monitored in the normal manner by the chip tester. Through utilization of this technique, the same test patterns which might number three thousand can be applied to the chip such that even though it remains on the planar board it can be tested equivalent to new. In this manner, each chip can be tested and a defective chip on a planar board isolated without mechanically isolating the chips by breaking chip interconnections.

11 Claims, 4 Drawing Figures

METHOD OF TESTING MOSFET PLANAR BOARDS

CROSS-REFERENCES TO RELATED APPLICATIONS

Application Ser. No. 238,268, filed Mar. 27, 1972, entitled "Serial Test Pattern for MOSFET Testing," having R. L. James as inventor, describes a MOSFET testing technique in which a pin or pins are utilized to serially input a test pattern into a register on the chip such that more points on a chip can be tested. That is, while normal test patterns are being input to the remaining pins of the chip, one or two of the pins are dedicated to a serial input and the register which is loaded, is selectively attached to otherwise untestable points on the chip thus providing additional reliability in testing.

BACKGROUND OF THE INVENTION

1. Field of the Invention

This invention relates to planar board testing in general and more particular to the testing of planar boards having MOSFET chips mounted thereon in such a manner that each of the chips can be electronically isolated and through conventional chip testing means be tested equivalent to new without need for mechanical isolation of the interconnected chips.

2. Description of the Prior Art

With the advent of MOSFET technology, there can be a great number of logic blocks formed on a MOSFET chip. For instance, assuming a chip with 48 input/output pins, five of which are utilized for power purposes, it is currently not uncommon for up to 600 logic blocks to be included on a single MOSFET chip. These MOSFET logic blocks are extremely difficult to test due to the fact that the logic blocks are interconnected, thus making it impossible to check each logic block independently. Testing of these types of chips, therefore, encompasses application of input test patterns to the input pins of the chip while monitoring the output patterns appearing on the output pins of the chip. In this manner testing of the overall chip rather than the discrete elements of the chip is accomplished. This testing, as described in the cross-reference patent application, can involve the application up to 3,000 test patterns to the input pins of the chip with appropriate monitoring of the outputs from the chip. These test patterns are extremely difficult to write, and as above indicated, the number of test patterns to accomplish accurate testing which is required is quite high. With 3,000 test patterns being applied to a chip, a 95 percent testability level can be achieved.

A second type of testing employed is that of testing an entire planar board on which are mounted a number of chips, such as twenty, and these chips are interconnected with each other to form a complete logic assembly. Obviously, input of test patterns into a planar board with monitoring of the output cannot result in the isolation of a particular chip in the event that an error in the operation of the planar board has been detected. There will be, of course, situations in which the chip containing faulty components can be readily identified through typical planar board testing techniques, but this situation is relatively rare. Thus the normal procedure, when a defective planar board is to be tested is to physically isolate each of the chips by breaking the connecting points from chip to chip and then applying the test patterns to each of the chips. In this manner, the defected chip can be located.

Since breaking of the interconnecting lines between each of the chips may result in the destruction of the planar board, and is additionally quite time consuming, it is desirable that a technique for testing each of the individual chips without mechanical isolation of the chips be devised.

SUMMARY OF THE INVENTION

In summary, there is provided a technique and implementation for testing individual chips mounted on a planar board, equivalent to new. Each of the individual chips mounted on the board has a NOR gate and an inverter on each of its output lines. As above described, this NOR gate is inexpensively formed by addition of a single input control line to the already existing preoff chip inverter. The output lines of each of the individual chips is connected to a conventional chip tester which monitors, in normal fashion, the output responses to determine whether the input test patterns applied by the chip tester to the chip has caused the chip to react in the desired manner. The NOR gates connected to the output of the chip to be tested do not receive any external input signal, while all of the remaining chips have their outputs driven to a one logical level by application of a one or high logical level along the input control line to their associated NOR gates. This causes a zero logical level to be output from the NOR gates which is inverted by the off chip inverter and results in ones appearing on the output lines of all of the chips which are not to be tested. The chip tester then applies test patterns to the input lines of the chip to be tested by selectively grounding those lines which require a zero logical level. It also simultaneously monitors the output lines of the chip to determine whether the chip is functioning properly. In this manner, each of the chips can be selectively electronically isolated and tested by application of all of the test patterns originally used prior to the mounting and interconnecting of the chips on the planar board. Thus, each chip can be tested equivalent to new without physically isolating it from the rest of the chips on the planar board and a defective chip readily located.

DESCRIPTION OF THE PREFERRED EMBODIMENT

Figure 1:
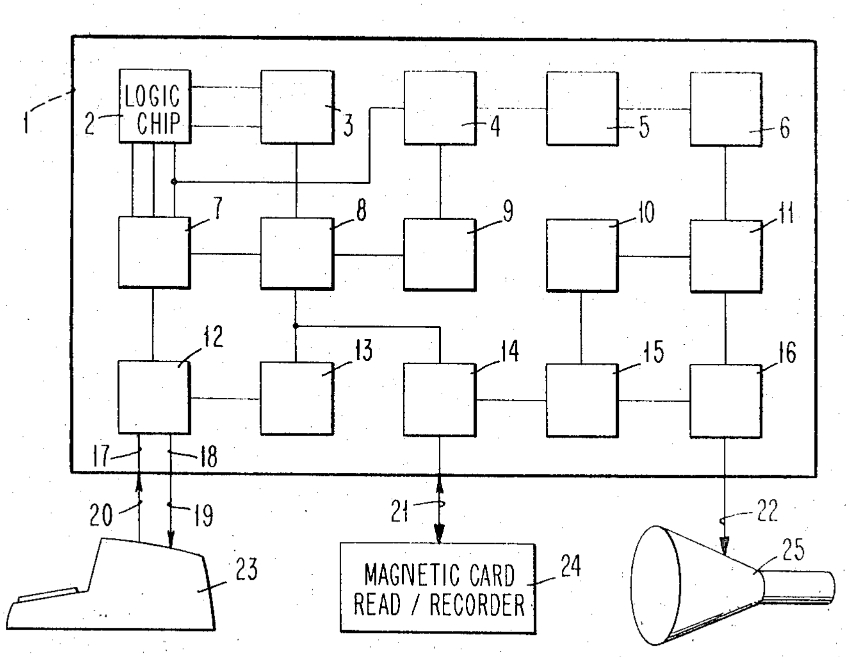
In FIG. 1 is shown a typical layout of a planar board with interconnected chips and with external ties to various devices such as a keyboard/printer, a magnetic read/recorder and a display.

In FIG. 1 is shown a planar board 1 having interconnected logic chips 2 through 16. While there are a number of lines shown interconnecting some of these chips, in the usual case only one line is shown. It will be appreciated by those skilled in the art that in the usual case, however, there will be a great number of interconnections and feedbacks between various chips on the board. The optimum layout of a planar board is one of the most difficult tasks currently encountered in engineering since each of the logic chips in one technology currently being utilized provides 48 pins per chip. Thus, it can be seen that with this pin arrangement there could be a large number of output lines from a single chip going to the other chips. It should be further understood that while five pins, assuming that there are 48 pins, are utilized for powering the chip, that the number of inputs to a chip need not be divided equally between input and output.

Further, shown for purposes of illustration of one application of a planar board, is a printer 23 which has external lines 20 and 19 which are input and output lines, respectively. These lines are connected to the planar board 1. Line 20 is connected to internal line 17, while line 19 is connected to internal line 18. Lines 17 and 18 are connected to chip 12. In addition, there is shown, for purposes of illustration only, a magnetic card read/recorder 24, which is connected along line 21 to the internal input line to logic block 14, and a display 25 connected along line 22 to the internal lead-in line of logic block 16. Again, it should be stressed that while there is shown only two input/output lines for the keyboard printer 23, and a single input/output line for the magnetic card read/recorder 24 and display 22, there will in actuality be a great number of input/output lines associated with each of the using devices.

Figure 2:
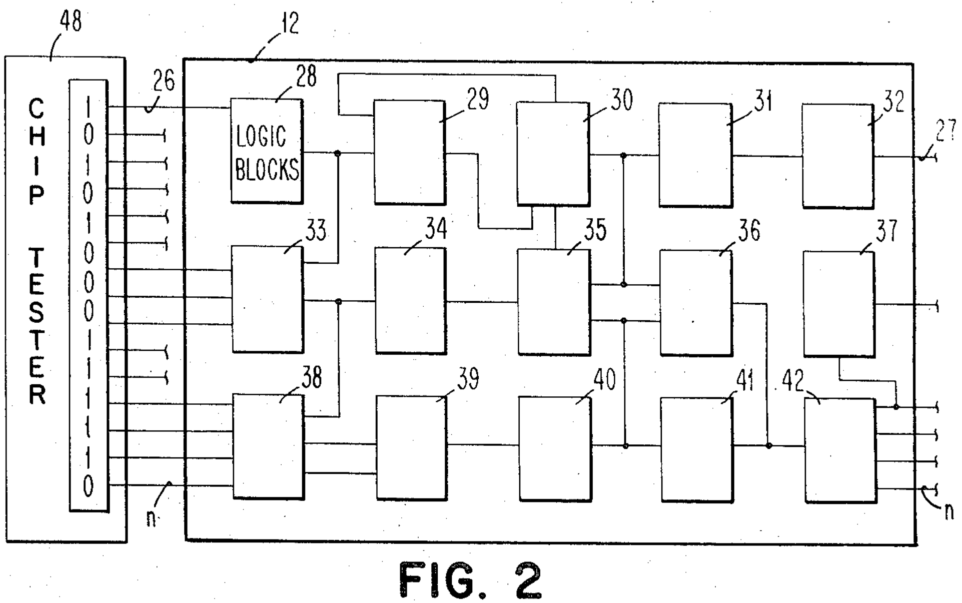
FIG. 2 illustrates a typical chip layout with logic blocks interconnected and a chip tester applying one possible test pattern to the pins of the chip.

In FIG. 2 there is shown a partial layout of a chip. The chip 12 as above stated may have 43 usable pins. Input pins or lines are 26 through *n* and the output lines are 27 through *n* and each of the input lines are connected to a chip tester 48. As illustrated, a logical pattern of ones and zeros are applied to the input lines and while not illustrated, the output lines are also monitored by the chip tester to assure that the desired logical output from the chip is obtained.

In FIG. 2, it can be seen that the logic blocks, 28 through 42 as was the case with respect to the planar board 1 are logically interconnected and while often single line interconnections are shown, in the usual case, depending on the logical functions implemented, more than one line will interconnect the logic blocks. By logic block is meant a particular logical circuit, such as an AND, OR, NOR, NAND, etc. These logic blocks as above discussed are interconnected to accomplish the logical function required of the chip and each chip is tested prior to mounting on a planar board by means of a tester as illustrated. It would, of course, be desirable to test each of the logic blocks individually to assure that it is functioning properly, but due to the extremely small size of these logic blocks when implemented in a technology such as MOSFET and due to their interconnection when formed, it is physically impossible to test each individually. Therefore, as described in the aforementioned copending patent application, there are a number of test patterns applied to the input pins of the chip and the output resulting from each of the test patterns is monitored. In this manner, a 95 percent testability level can be achieved. It has been determined that a 95 percent testability level, while not being entirely satisfactory, is acceptable in most applications. This is especially true in light of the fact that it would take much more time and effort to write additional test patterns to bring the chip up to a 98 or 99 percent testability level, and it is generally recognized that it is impossible or at least impractical to test a chip to assure that it is 100 percent reliable.

Figure 3:
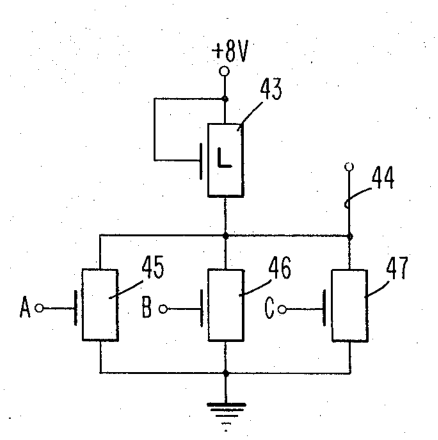
FIG. 3 is illustrative of a typical NOR circuit implemented in MOSFET technology to illustrate the operation of the NOR devices connected to each of the output lines of each of the chips on a planar board.

To aid in an understanding of the NOR devices used in the subject invention, refer to FIG. 3 wherein there is shown a typical implementation of a NOR gate implemented in MOSFET technology. This is a generalized NOR device. FET 43 is the load device; the other three devices 45, 46 and 47 are the input devices to the NOR gate. Any one of the devices 45, 46 or 47 can pull line 44 to ground or to the zero logical level when it is turned on by application of a positive logical level to its input A, B or C respectively. Device 43 (the load device) causes the output on line 44 to go high in the absence of any logical one or high logical level being applied to devices 45, 46 or 47.

Figure 4:
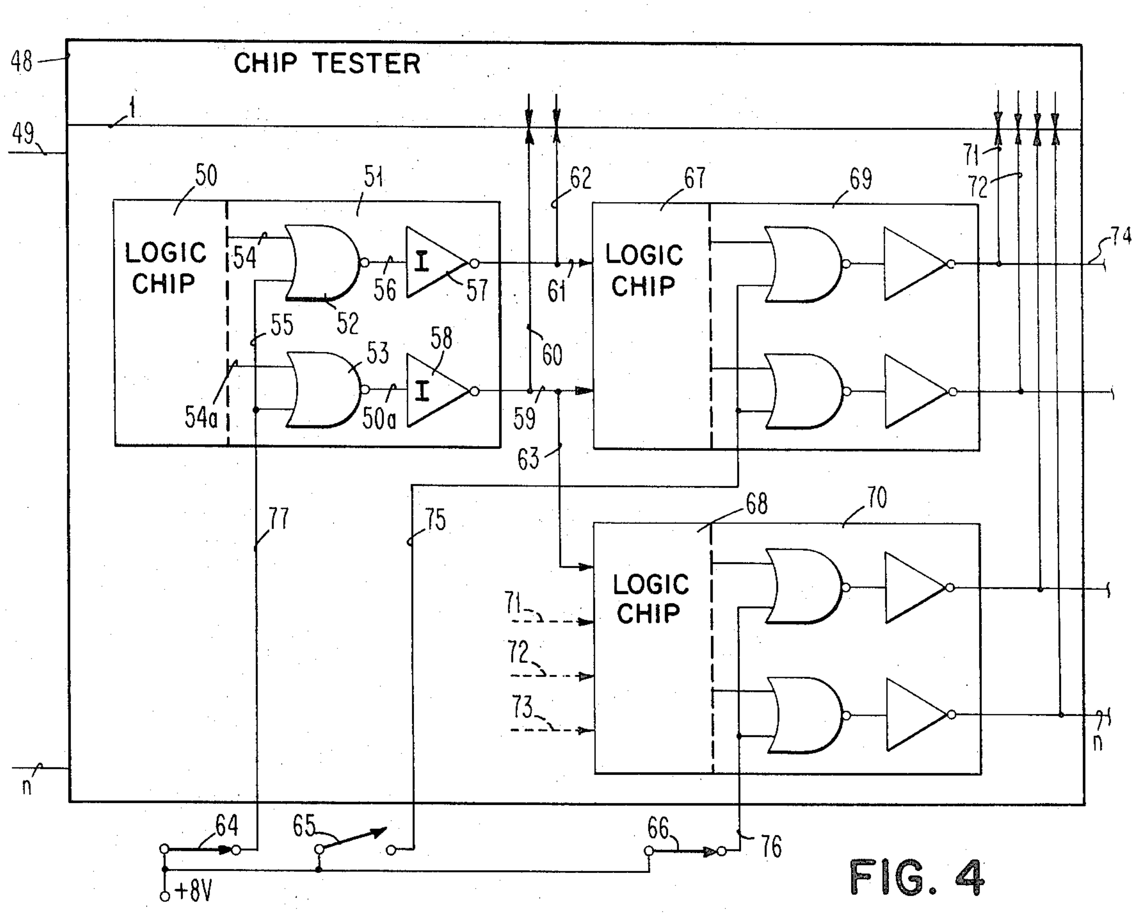
FIG. 4 illustrates the particular implementation utilized in the subject invention in which NOR gates and inverters are connected and controlled in a manner such that individual chips mounted on a planar board can be tested equivalent to new without physically isolating them.

For a detailed description of the subject invention refer next to FIG. 4 wherein there is shown a planar board 1 connected to a chip tester 48. The planar board 1 has logic chips 50, 67 and 68 mounted on it and these chips are interconnected. Only three chips are shown mounted on planar board 1 for purposes of simplicity; however, it will be appreciated by those skilled in the art that in the usual case there will be many more logic chips mounted on a planar board. For instance, it is not uncommon for each of the logic chips to contain 600 logic blocks and each of the planar boards to contain upwards of twenty logic chips. The input to planar board 1 is along lines 49 through *n* and the output from the planar board 1 is taken along lines 74 through *n*.

Assume for purposes of explanation, that logic chip 67 is to be tested, as shown, it receives inputs from logic chip 50, but could receive inputs from any other chips on the board. Each of the output lines 54 and 54*a* from logic chip 50 are input to NOR gates 52 and 53 respectively, and these NOR gates have their outputs applied along lines 50 and 50*a* to off chip inverters 57 and 55, respectively. The output from inverter 57 is applied along line 61 to make up an input to logic chip 67 and line 61 is also connected in two-way communication along line 62 to the chip tester 48. Likewise, the output from inverter 55 is applied along line 59 as an input to logic chip 67 and it is a two-way communication along line 60 to chip tester 48. Further, for purposes of merely illustrating that the chips as above described are interconnected, a connection to logic chip 68 is shown from line 59 along line 63 and in phantom form lines 71, 72 and 73 constitute additional inputs to logic chip 68. Since each of the outputs from the logic chips have identical NOR's and inverters on their outputs, the output NOR' s and inverters of logic chips 67 and 68, which are in blocks 69 and 70, respectively, will not be described. Their operation is entirely identical to the operation of the output block 51 connected to logic chip 50 which will hereinafter be described.

As above indicated, when logic chip 67 is to be tested, there is no input on line 75 which constitutes the control line for the NOR gate in the output block 69 of logic chip 67 and thus the output from logic chip 67 is unaffected by the NOR gates. That is, switch 65 which has one terminal connected to a positive plus eight potential is open. However, switches 64 and 66 are closed, thus applying a positive logical level along lines 76 and 77 to the NOR circuits in output blocks 70 associated with logic chip 68 and output block 51 associated with logic chip of 50, respectively. If there were additional chips illustrated, each of the lines which constitute the second input to the NOR gates in the output logic block of all of the non-tested chips would also receive a positive logical level input. Referring in particular to the output block 51, associated with logic block 50, it can be seen that in accordance with the description of the MOSFET NOR gate of FIG. 3, that application of a positive logical level will cause its output to go to ground or a zero logical level regardless of the output from the logic chip with which it is associated. That is, it does not matter whether there is a zero or a one on lines 54 or line 54*a*. The sole control for testing purposes is the application of the logical levels to lines 75, 76 and 77. When the outputs from NOR circuits 52 and 53 go low, the input lines 50 and 50*a* connected thereto input a zero logical level to inverters 57 and 55, respectively. This results in positive levels being applied to all of the chips which are connected to these lines. Thus, it can be seen that all of the outputs from all of the non-tested chips are by application of positive logical levels to the NOR's in their output blocks driven to a high logical level. The only chip which does not have its output block forced to output, a high logical level on each of its output lines, is chip 67 which is the chip to be tested. Instead, the output of the NOR circuits and inverters, which are connected to logic chip 67, are controlled solely by the operation of the logic chip since its NOR circuits do not receive an external controlling potential.

Logic chip 67 is then tested in a conventional manner. That is, its input lines are brought to a zero or low logical level or left at a one logical level in accordance with the various test patterns to be applied to the chip. That is, line 62, in the event that the input along 61 to the logic chip 67 for a particular test is to remain at a one level will not be toggled by the chip tester while, assuming that a zero is to be applied to logic chip 67 along line 59 the chip tester will cause this line to go to a zero logical level. Through this manner of operation, all of the original test patterns can be applied to the logic chip 67 which were applied at the time of assembly and it can be tested equivalent to new by monitoring by means of the chip tester 48 the outputs appearing on lines 71 and 72 which are connected to the output of the NOR output blocks 69. Again this monitoring of the outputs is in accordance with the original monitoring done at the time of assembly and this, therefore, allows equivalent to new testing. Any of the other chips could also be selectively isolated by operation of the switches 64, 65 and 66 such that all chips which are not to be tested receive no input while the chips remaining on the board are all forced by application of a positive logical level to their NOR gates in their output blocks to output positive logical levels.

In the above described manner, there is provided a technique and implementation for testing individual chips mounted on a planar board, equivalent to new. Each of the individual chips mounted on the board has a NOR gate and an inverter on each of its output lines. The output lines of each of the individual chips is connected to a conventional chips tester which monitors, in normal fashion, its output response to determine whether the input test pattern applied by the chip tester to the chip has caused the chip to react in the desired manner. The NOR gates connected to the output of the chip to be tested do not receive any external input signal, while all of the remaining chips have their outputs driven to a one logical level by application of a one or high logical level to their associated NOR gates. This causes a zero logical level to be output from the NOR gates which is inverted and results in ones appearing on the output lines of all of the chips which are not to be tested. The chip tester then applies test patterns to the input lines of the chip to be tested by selectively grounding those lines which require a zero logical level. It, also, simultaneously monitors the output lines of the chip to determine whether the chip is functioning properly. In this manner, each of the chips can be selectively electronically isolated and tested by application of all of the test patterns originally used prior to the mounting and interconnecting of the chips on the planar board. Thus, each chip can be tested equivalent to new without physically isolating it from the rest of the chips on the planar board and a defective chip readily located.

It will thus be appreciated by those skilled in the art that there has been provided a technique of testing logic chips mounted on a planar board which effectively electronically isolates each of the chips such that it can be tested independently by a standard chip tester and through means of this isolation, all of the original test patterns can be applied to the chip to be tested and its responses monitored to determine which of the chips on the planar board is defective without any mechanical isolation required. The above is additionally accomplished quite inexpensively in that all that is required to be added to the chips is a single control line to the already available preoff chip inverters.

While the invention has been particularly shown and described with reference to a particular embodiment, it will be understood by those skilled in the art that various changes in form and detail may be made without departing from the spirit and scope of the invention.

What is claimed is:

1. A method of testing individual chips, having input lines and output lines, mounted on a planar board while said chips are interconnected in a manner so as to perform desired logical functions comprising the steps of:

a. electronically isolating the said chip to be tested by application of control signals to logic means on said chip;
b. applying test patterns to the input lines of said chip to be tested;
c. monitoring the outputs appearing on said output lines of said chip to be tested which result from said input test patterns; and
d. comparing said monitored outputs with predetermined expected outputs to determine whether said chip being tested is defective.

2. The method of testing of claim 1 wherein said step of electronically isolating said chip to be tested is accomplished by causing all of the output lines of all of said chips which are not to be tested to be driven to the same logical level.

3. The method of testing of claim 2 further wherein certain of said input lines of said chip to be tested are driven to a different logical level to correspond with said desired test patterns.

4. The method of testing of claim 3 wherein said step of electronically isolating said chip to be tested is accomplished by causing all of said output lines of all of said chips which are not to be tested to be driven to a high logical level.

5. The method of testing of claim 4 wherein said input lines of said chip to be tested are selectively driven to a low logical level to correspond with said desired test patterns.

6. The method of testing of claim 5 wherein said logic means is an output block associated with each of said chips and a control line connected to each of said output blocks and a first potential applied to the output blocks of all of said chips which are not to be tested and a second potential applied to said output block of said chip to be tested.

7. The method of testing of claim 6 wherein said first potential is said high logical level and said second potential is said low logical level.

8. The method of testing of claim 7 wherein said output blocks are operative such that said application of said low logical level to said blocks will not affect their outputs.

9. A planar board having individual logic chips having input and output lines mounted thereon with said input and output lines being logically interconnected comprising:

a. an output block connected in series with said output lines of each of said chips;

b. means for selectively applying logical levels to said output blocks to cause all of said output lines except those from a chip to be tested to assume a common logical level;

c. means for applying test patterns to one of said chips to be tested;

d. means for monitoring the outputs appearing on said output lines of said chip to be tested; and e. means for comparing said monitored outputs with predetermined expected outputs to determine whether said chip being tested is defective.

10. The apparatus of claim 9 wherein said chip to be tested has a low logical level applied to its output block.

11. The apparatus of claim 10 wherein said output blocks include a NOR gate and an inverter connected to each of said output lines.

* * * * *